US012764540B2

(12) United States Patent
Shvetsov et al.

(10) Patent No.: US 12,764,540 B2
(45) Date of Patent: *Oct. 13, 2026

(54) SYSTEM AND METHOD FOR CLASSIFYING INCOMING EVENTS BY USER'S MOBILE DEVICE BASED ON USER PREFERENCES

(71) Applicant: AO Kaspersky Lab, Moscow (RU)

(72) Inventors: Dmitry V. Shvetsov, Moscow (RU); Daniil A. Yazovsky, Moscow (RU); Vitaly S. Vorobiov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 26 days.

This patent is subject to a terminal disclaimer.

(21) Appl. No.: 18/644,392

(22) Filed: Apr. 24, 2024

(65) Prior Publication Data

US 2024/0276225 A1 Aug. 15, 2024

Related U.S. Application Data

(63) Continuation of application No. 17/332,174, filed on May 27, 2021, now Pat. No. 11,997,494.

(30) Foreign Application Priority Data

Jun. 19, 2020 (RU) .......................... RU2020120449

(51) Int. Cl.

| | |
|---|---|
| ***H04L 29/06*** | (2006.01) |
| ***G06N 5/04*** | (2023.01) |

(Continued)

(52) U.S. Cl.

CPC ........... *H04W 12/122* (2021.01); *G06N 5/04* (2013.01); *G06N 20/00* (2019.01)

(58) Field of Classification Search

CPC ....... H04W 12/122; G06N 5/04; G06N 20/00; G06N 3/08; G06N 5/01; G06N 7/01; H04L 63/1408

See application file for complete search history.

(56) References Cited

U.S. PATENT DOCUMENTS 8,443,049 B1 * 5/2013 Geddes ................ H04L 63/126 709/208
2015/0249737 A1 * 9/2015 Spievak ............... H04M 3/436 379/189

(Continued)

*Primary Examiner* — Ka Shan Choy

(74) *Attorney, Agent, or Firm* — ArentFox Schiff LLP; Michael Fainberg

(57) ABSTRACT

Disclosed herein are methods and systems for classifying incoming events by user's mobile device based on user preferences. In one aspect, an exemplary method comprises: intercepting an incoming event received by a mobile device, analyzing content of the intercepted event to determine one or more attributes of the intercepted event, comparing the intercepted event to a plurality of previously collected and classified events, stored in an event repository, based on the one or more determined attributes to identify one or more similar events, determining a rating value of the one or more similar events based on a matrix of user preferences, wherein the rating value indicates probability that the corresponding event belongs to a particular class of events, and classifying the intercepted event as undesirable on the mobile device if the rating value of the one or more similar events is less than a predetermined threshold value.

21 Claims, 4 Drawing Sheets

(51) Int. Cl.

| | |
|---|---|
| ***G06N 20/00*** | (2019.01) |
| ***H04W 12/122*** | (2021.01) |

(56) References Cited

U.S. PATENT DOCUMENTS

| | | | | |
|---|---|---|---|---|
| 2015/0281431 | A1* | 10/2015 | Gainsboro ............ | H04M 1/271<br>379/189 |
| 2017/0302794 | A1* | 10/2017 | Spievak .............. | H04M 3/2281 |
| 2017/0323101 | A1* | 11/2017 | Langton .............. | H04L 63/1433 |
| 2018/0270261 | A1* | 9/2018 | Pande ...................... | G06N 7/01 |
| 2019/0266325 | A1* | 8/2019 | Scherman ............. | G06F 21/554 |
| 2021/0141897 | A1* | 5/2021 | Seifert .................. | G06F 21/561 |

* cited by examiner

SYSTEM AND METHOD FOR CLASSIFYING INCOMING EVENTS BY USER'S MOBILE DEVICE BASED ON USER PREFERENCES

CROSS-REFERENCE TO RELATED APPLICATION

The present application is a continuation of U.S. patent application Ser. No. 17/332,174, filed on May 27, 2021, which claims priority to a Russian Application No. 2020120449 filed on Jun. 19, 2020, which are incorporated by reference herein in their entirety.

FIELD OF TECHNOLOGY

The invention relates to the technical field of information security, and, more specifically, to systems and methods for classifying incoming events by user's mobile device, e.g., based on user preferences.

BACKGROUND

At present, owners of mobile devices (such as mobile telephones, smartphones, tablets, and the like) often encounter undesirable automated calls, SMS (Short Message Service) communications, emails from banks, medical centers, insurance firms, beauty salons and other telemarketers. The majority of these telemarketing companies implicitly write the distribution of advertisements and/or other telemarketing content through communication networks into their contracts with users, and thereby get around legal restrictions.

The companies providing telemarketing services actively employ artificial intelligence, such as intelligent robots, also referred to as "bots", which are configured to imitate people when dealing with them. Sometimes, robots determine the current level of irritability of a person they are dealing with and sometimes even specifically organize the conversation so as to mask their artificial nature. Likewise, hackers often use communication networks to obtain a user's confidential information (for example, data on credit cards, social security numbers, and the like).

Mobile applications which identify telephone numbers (such as TrueCaller) are often used to protect users from the described abuses in telecommunication networks. In the majority of cases, such mobile applications check incoming calls against a database of spam numbers, which is constantly updated based on feedback from the users, and if the number of a spammer or hacker is found in this database, the user may be notified that the calling party has been previously spotted in nuisance communication.

However, the general assumption under such an approach is that all received notifications are nuisance communications and does not account for user's personal needs. Put another way, at least some events of significance to the particular user might be categorized as suspicious spam. For example, notification on bank loans, which can be annoying to some users, other users might be interested in such a service.

Although the aforementioned procedure works well in forming the reputation of a calling party and filtering the majority of undesirable incoming calls, it is not able to define personal rules of classification. Moreover, this procedure may be used solely for voice calls.

Thus, there is a need to define rules for classification of incoming events, including telephone calls, SMS communications, emails and HTML blocks.

SUMMARY

Aspects of the disclosure relate to classifying incoming events by user's mobile device based on user preferences.

In one exemplary aspect, a method for classifying incoming events by user's mobile device is disclosed, the method comprising: intercepting an incoming event received by a mobile device; analyzing content of the intercepted event to determine one or more attributes of the intercepted event; comparing the intercepted event to a plurality of previously collected and classified events, stored in an event repository, based on the one or more determined attributes to identify one or more similar events; determining a rating value of the one or more similar events based on a matrix of user preferences, wherein the rating value indicates probability that the corresponding event belongs to a particular class of events; and classifying the intercepted event as undesirable on the mobile device if the rating value of the one or more similar events is less than a predetermined threshold value.

In one aspect, the rating value is based on one or more rating attributes that comprise at least one of: parameters of a media content of the intercepted event, time duration from the moment of interception of the intercepted event, a flag for viewing the media content of the intercepted event by a user, a flag for removal of the media content of the intercepted event by the user.

In one aspect, the rating value is determined using a machine learning model based on one or more rating attributes.

In one aspect, the machine learning model comprises one of: a naive Bayesian classifier model, a logistic regression model, a Markov Random Field (MRF) classifier model, a Support Vector Machine (SVM) model, a k nearest-neighbor model, and a decision tree model.

In one aspect, the classifying of the intercepted event comprises determining a mobile user profile from the plurality of previously collected and classified events, wherein the mobile user profile comprises a vector containing elements of the matrix of user preferences.

In one aspect, the determining of the mobile user profile comprises reconstructing approximated values of the matrix of user preferences using a gradient descent optimization, and determining the rating value based on zero values of the reconstructed matrix of user preferences.

In one aspect, comparing the intercepted event to the plurality of previously collected and classified events comprises further comprises: generating a vector representing the intercepted event, generating a plurality of vectors representing the plurality of previously collected and classified events, and calculating a similarity value between the intercepted event and each of the plurality of previously collected and classified events based on cosine distance values between corresponding vectors.

According to one aspect of the disclosure, a system is provided for classifying incoming events by user's mobile device based on user preferences, the system comprising at least one memory; and at least one hardware processor coupled with the at least one memory and configured, individually or in combination, to: intercept an incoming event received by a mobile device; analyze content of the intercepted event to determine one or more attributes of the intercepted event; compare the intercepted event to a plurality of previously collected and classified events, stored in an event repository, based on the one or more determined attributes to identify one or more similar events; determine a rating value of the one or more similar events based on a matrix of user preferences, wherein the rating value indicates probability that the corresponding event belongs to a particular class of events; and classify the intercepted event as undesirable on the mobile device if the rating value of the one or more similar events is less than a predetermined threshold value.

In one exemplary aspect, a non-transitory computer-readable medium is provided storing a set of instructions thereon for classifying incoming events by user's mobile device based on user preferences, wherein the set of instructions comprises instructions for: intercepting an incoming event received by a mobile device; analyzing content of the intercepted event to determine one or more attributes of the intercepted event; comparing the intercepted event to a plurality of previously collected and classified events, stored in an event repository, based on the one or more determined attributes to identify one or more similar events; determining a rating value of the one or more similar events based on a matrix of user preferences, wherein the rating value indicates probability that the corresponding event belongs to a particular class of events; and classifying the intercepted event as undesirable on the mobile device if the rating value of the one or more similar events is less than a predetermined threshold value.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for defining classification rules of intercepted events on user's mobile device based on user preferences. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
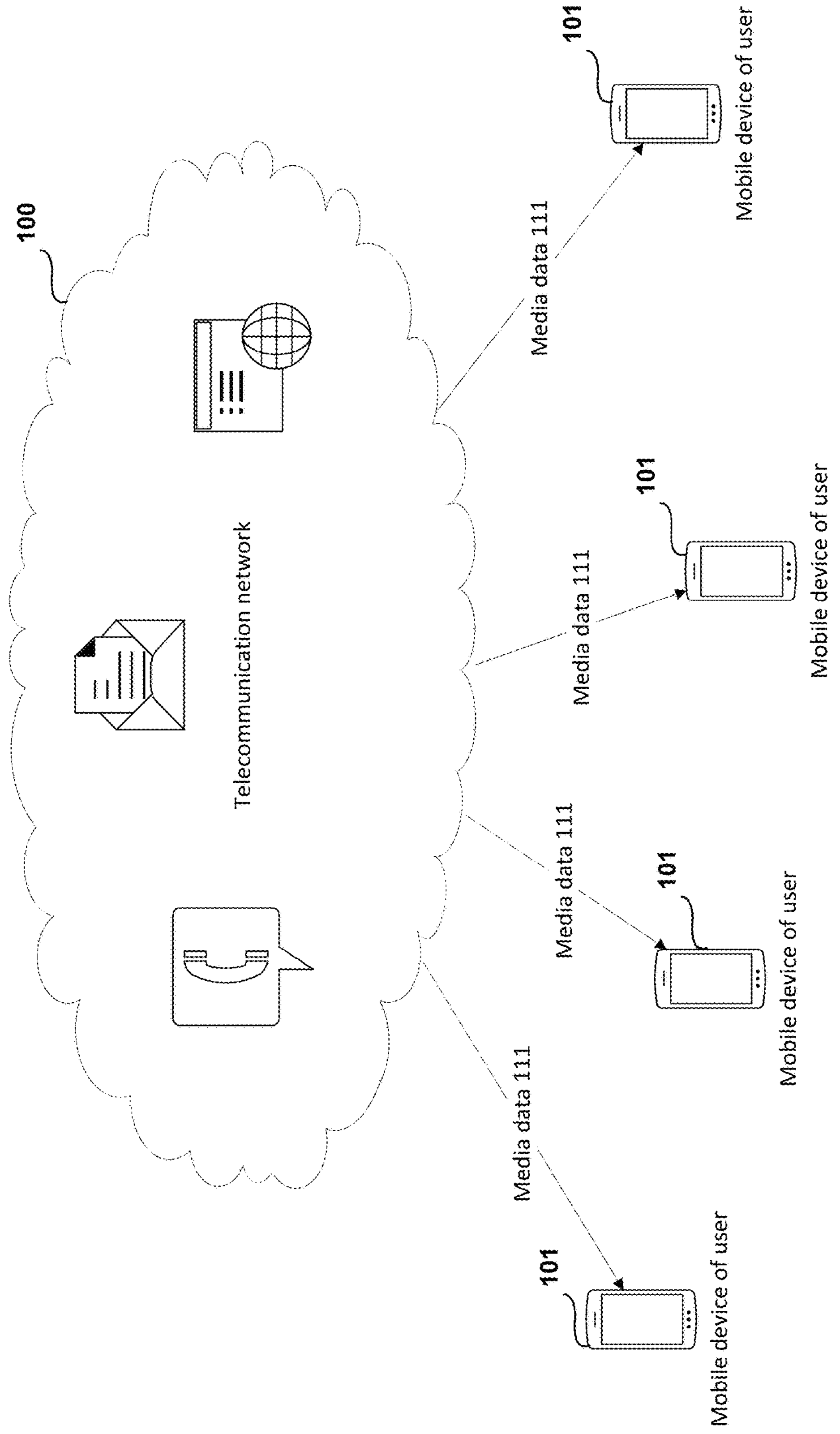
FIG. 1 illustrates a general architecture of a telecommunication network.

FIG. 1 illustrates a general architecture of a telecommunication network.

More specifically, FIG. 1 illustrates a telecommunication network 100, a mobile device of a user 101, and media data 111.

The telecommunication network 100 may include a communication system of physical communication channels realizing traditional communication protocols for transmission of media data 111 between the user's mobile device 101 and various nodes of the telecommunication network 100.

For example, and without limitation, the telecommunication network 100 may include: a computer communication network (e.g. an Internet, a Wide Area Network "WAN," a Local Area Network "LAN," a Personal Area Network "PAN," a Metropolitan Area Network "MAN," a terrestrial computer communication network, a satellite computer communication network, and the like); a telephone communication network (e.g., a Public Switched Telephone Network ("PSTN")); a cellular communication network (e.g., 1G, 2G, 3G, 4G, 5G, CDMA, WCDMA, PDC, TDMA, GSM/GPRS/EDGE, and the like).

As used herein, the term "mobile device" 101 refers to a piece of equipment configured to transform user information into media data 111 for transmission via the telecommunication network 100 and configured to perform the reverse transformation upon receiving media data 111.

As used herein the term "event" refers to a process of exchanging media data 111 between the user's mobile device 101 and other nodes of the telecommunication network 100.

For example, the mobile device of the user 101 might be a mobile telephone of a subscriber of a cellular communication network, where the event might be, without limitation: a voice call; a SMS message.

Figure 2:
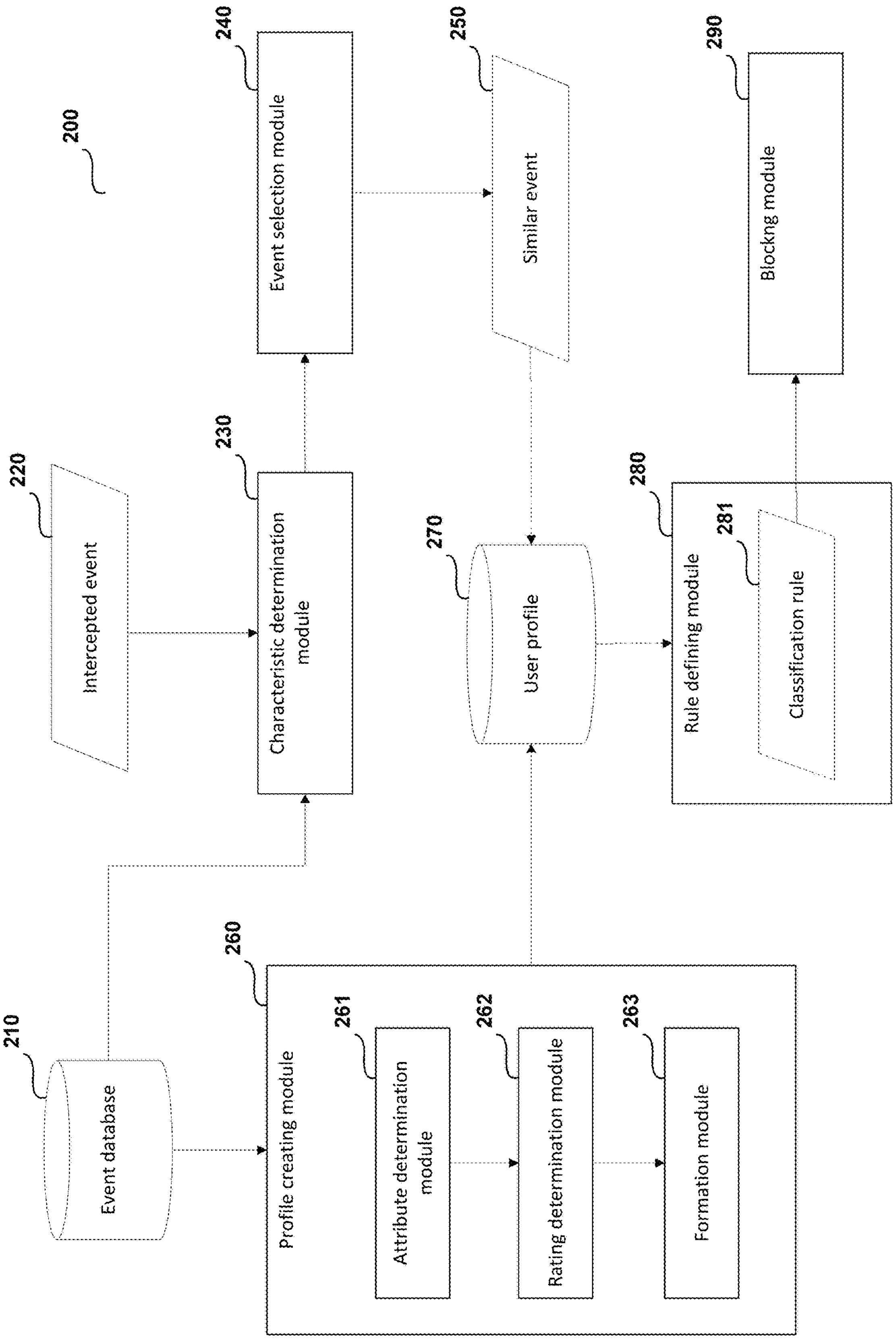
FIG. 2 illustrates an example of a system for defining classification rules of intercepted events on user's mobile device.

FIG. 2 illustrates an example of a system for defining classification rules of intercepted events on user's mobile device.

The system 200 shown in FIG. 2 may include, without limitation, an event database 210, an intercepted event 220, a characteristic determination module 230, an event selection module 240, a similar event 250, a profile creating module 260, an attribute determination module 261, a rating determination module 262, a formation module 263, a user profile 270, a rule defining module 280, a classification rule 281, and a blocking module 290.

In an aspect, the characteristic determination module 230 may be configured to intercept an incoming event, determine the characteristics of the incoming event and send the determined characteristics to the event selection module 240.

In one aspect, the incoming event on the user's mobile device 101 may include, but is not limited to: a received incoming call; a received incoming SMS message; a received incoming email; a downloaded HTML (hypertext mark-up language) page.

In another aspect, the characteristic determination module 230 may be configured to automatically transform a voice call into formatted text using a speech recognition algorithm, for example.

In one aspect, the characteristic of the incoming event may include, without limitation, at least:

- recognized speech;
- the text of a SMS message;
- the content of the service fields of an email;
- the content of an email;
- the content of the service headers of a HTML page;
- the content of a HTML page.

The event selection module 240 may be configured to calculate the similarity of the intercepted event 220 to an event from the event database 210. In addition, the event selection module 240 may be configured to send the event whose similarity to the intercepted event 220 is greater than a predetermined value to the rule defining module 280.

In one aspect, the event selection module 240 may be configured to perform a preprocessing of the event characteristic. The preprocessing of the event may include, without limitation, at least:

removal of irrelevant characters from the event characteristic, not belonging to the alphanumerical characters (such as hyphens);

converting all characters of the event characteristic to lower case;

removal of no informative stop words (such as hello) from the event characteristic;

converting of different forms of the same word found within the event characteristic to the dictionary form (lemmatization);

distinguishing the stem of a word (stemming).

In another aspect, the event selection module 240 may identify attributes for determining the similarity of two events on the basis of the analyzed characteristics.

The identified attributes may include, but are not limited to:

words;

a sequence of words (n-grams);

a vectorial representation of words (word-embedding);

a multiple set of words, not considering grammar or order (bag-of-words)

For example, in one aspect, the event selection module 240 may transform the received SMS message "Autumn discounts—20% on women's shoes" into the vector:

| | autumn | discount | twenty | women | shoe |
|---|---|---|---|---|---|
| sms | 1 | 1 | 1 | 1 | 1 |

In one aspect, the event selection module 240 may at first identify a set of attributes for determining the similarity of events $s_i$ from the event database 210. The identified set may be represented in the form of a dictionary length vector n, where the number of occurrences $f_{if}$ of that word in the characteristic of the event $s_i$ appears in the position corresponding to the number of the word $w_j$. In other words, a text consists of a plurality of words comprising a dictionary. Each phrase in the text may be represented as a vector corresponding to the dictionary. If a word from the dictionary is present in the phrase then 1 appears in the dictionary length vector in the position corresponding to that word, otherwise (if a corresponding dictionary word is not present in the phrase) 0 appears in that position.

The event selection module 240 may represent this identified set of attributes in the form of a sparse matrix M:

| | $w_1$ | . . . | $w_j$ | . . . | $w_n$ |
|---|---|---|---|---|---|
| $s_1$ | $f_{11}$ | | $f_{1j}$ | | $f_{1n}$ |
| $s_2$ | $f_{21}$ | | $f_{2j}$ | | $f_{2n}$ |
| $s_i$ | $f_{i1}$ | | $f_{ij}$ | | $f_{in}$ |

The event selection module 240 may be configured to add to the end of the matrix M a row of attributes for determining the similarity of the intercepted event 220, represented in the form of a dictionary length vector n. Matrix M is considered to be preformed (before the interception of the current event). Therefore, characteristics of the intercepted event are added to the end of the matrix.

In another aspect, the event selection module 240 may modify the matrix M using a TF-IDF transformation (Term Frequency-Inverse Document Frequency), where TF is the frequency of the word w in the event s, and IDF is the logarithm of the inverse frequency of occurrence of the word W in the set of all events C and can be represented by the following formula (1):

$$TF-IDF=\frac{\text{count }(w,s)}{\text{count }(s)}\times\log\left(\frac{\sum_{s\in C}1(w,s)}{|C|}\right) \tag{1}$$

The event selection module 240 may be further configured to perform a singular decomposition (e.g., Singular Value Decomposition, SVD) of the obtained matrix M into three components:

$$M=S\times D\times W^t,$$

where S and $W^t$ are orthogonal matrices, and D is a diagonal matrix. The singular numbers are the diagonal elements of the diagonal matrix D arranged in descending order. The SVD is the best known and widely used factoring method, see Golub et al., "Matrix Computations," Johns Hopkins U. Press, 1996.

According to matrix multiplication rules, the columns and rows corresponding to the smaller singular elements make the least contribution to the resulting product. Accordingly, the event selection module 240 may be configured to ignore the last columns of the matrix S and the last rows of the matrix $W^t$ during matrix multiplication operations, keeping only the first k. Thus, the event selection module 240 may represent each event $s_i$ from the event database 210 and the intercepted event 220 as a vector of length k≤n, where k has a predetermined value:

$$\begin{bmatrix} s_1 \\ s_2 \\ \dots \\ s_i \end{bmatrix}=\begin{bmatrix} x_{11} & x_{21} & \dots & x_{k1} \\ x_{21} & x_{22} & \dots & x_{k2} \\ & & \dots & \\ x_{i1} & x_{2i} & \dots & x_{ki} \end{bmatrix}$$

For example, for k=2 the event selection module 240 performs a two-dimensional singular decomposition, representing each event as a two-dimensional vector.

In one aspect, the event selection module 240 may calculate the similarity of one or more events from the event database 210 to the intercepted event 220. For example, the event selection module 240 may calculate a cosine distance value between a vector corresponding to the intercepted event and each of the plurality of vectors corresponding to the plurality of events in the event database 210. The event selection module 240 may use the cosine distance value as the measure of similarity. In an aspect, one or more events from the event database 210 whose similarity to the intercepted event 220 is greater than a predetermined value may be sent by the event selection module 240 to the rule defining module 280.

For example, an event with the characteristic (content) of "invitation to a children's Christmas party" is more likely to have a greater similarity to an event with the characteristic of "discounts on children's presents" than to an event with the characteristic of "rating of alcoholic cocktails".

In one aspect, the event selection module 240 may perform a cluster analysis of previously collected events to create groups of similar events.

In another aspect, the event selection module 240 may perform a cluster analysis of events based on a machine learning model, including without limitation: the k-means; the k-median; the EM algorithm (expectation-maximization algorithm); an algorithm based on a neural net. The k-means algorithm is a method for partitioning n observations (or input data) into k clusters, wherein n and k are integers. (See, e.g., Aapo Hyvarinen, Juha Karhunen, and Erkki Oja, "Independent Component Analysis," John Wiley & Sons, Inc., New York, N.Y., 2001.). The original version of the Expectation Maximization (EM) algorithm was an iterative algorithm that used the entire dataset on each iteration. More recently, online versions have been developed that process a single data point at each iteration. See Percy Liang and Dan Klein, "Online EM for Unsupervised Models," In NAACL '09*: Proceedings of Human Language Technologies: The* 2009 *Annual Conference of the North American Chapter of the Association of Computational Linguistics*, Morristown, N.J., pp. 611-619, 2009.

The profile creating module 260 may be configured to create the user profile 270 and send the user profile 270 to the rule defining module 280.

The profile creating module 260 may include the attribute determination module 261, the rating computing module 262, and the formation module 263.

The attribute determination module 261 may be configured to determine attributes which are suitable for the classification of events from the event database 210 and configured to send these attributes to the rating determination module 262. The attribute determination module 261 uses attributes to classify the events as, for example, regular, undesirable and the like. In other words, the attribute determination module 261 may determine whether the intercepted event would be of any interest to a user. It should be noted that classification attributes are different from the similarity attributes mentioned above. Similarity of events is determined based on tex. If two events contain the same words, then they will have a high similarity.

The attributes suitable for the classification of events may include, without limitation:

- the parameters of the media data of the event (e.g., a flag indicating a presence of key phrases);
- the period of time since the moment of intercepting (receiving) the event on the mobile device 101;
- a flag for the viewing of the media data of the event by the user of the mobile device 101.
- a flag for removal by the user of the media data of the event from the mobile device 101.

In an aspect, the attribute determination module 261 may be configured to use the aforementioned flags in order to determine if the event was interesting to the user.

The rating determination module 262 may be configured to compute the rating value of an event from the event database 210, where the rating value characterizes the probability that the event belongs to a particular class. The rating determination module 262 may be further configured to send the computed rating value to the formation module 263.

In an aspect, the classes of the event may include, but are not limited to:

- regular—a class which characterizes events expected by the user (for example, notification of a banking transaction);
- undesirable—a class which characterizes events eliciting a negative reaction and ignored by the user (such as spam);
- unknown.

In one aspect, the attribute determination module 261 may be used to first collect the attributes of events pertaining to a previously known class of events. On the basis of the collected data, the attribute determination module 261 may train the classification model so that events similar in their attributes can be grouped into one class by that classification model with an accuracy higher than a predetermined value.

The classification algorithm may include without limitation: naive bayesian classifiers; logistic regression; MRF classifier; the SVM (support vector machine) method; k-nearest neighbor methods; decision tree.

The rating determination module 262 may send the event attributes for the selected events from the event database to the trained model, which makes a decision, with a certain probability, on whether the event belongs to one of the classes.

In one aspect, the rating determination module 262 may recalculate the rating of the previously intercepted events from the event database 210 using the trained model so that the probability of the event belonging to a given class is higher than that in the current classification. At least ins some cases, users may react to events over time. For example, users may respond to a message that was previously classified as undesirable. Thus, in such case, the probability of undesirability of such event will decrease.

The formation module 263 may be configured to generate the user profile 270.

In one aspect, the formation module 263 may first determine a set of vectors of length n, equal to the number of all intercepted events on devices of all users in the event database 210, where the position $r'_j$, corresponding to the event $s_j$ on the user's mobile device 101, includes at least:

- the rating value corresponding to the event $s_j$, as determined by the rating determination module 262, on the user's mobile device 101;
- a zero value, if the media data of the event were not previously intercepted on the mobile device of the user 101.

This set of vectors may be represented as a matrix M' by the formation module 263:

| | $s_1$ | . . . | $s_j$ | . . . | $s_n$ |
|---|---|---|---|---|---|
| $u_1$ | $r'_{11}$ | | $r'_{1j}$ | | $r'_{1n}$ |
| $u_2$ | $r'_{21}$ | | $r'_{2j}$ | | $r'_{2n}$ |
| $u_i$ | $r'_{i1}$ | | $r'_{ij}$ | | $r'_{in}$ |

For example, for a large number of events $s_j$ and users $u_i$ the formation module 263 may form a highly sparse matrix M', since only a small portion of all events from the event database 210 are intercepted on the mobile device 101 of the user $u_i$.

In one aspect, the formation module 263 may perform a decomposition of the obtained matrix M' into two components with k elements, where k≤n has a predetermined value:

$$M' = P \times Q^t$$

where P and $Q^t$ are orthogonal matrices. An orthogonal matrix is a real square matrix whose columns and rows are orthogonal unit vectors (orthonormal vectors).

In an aspect, the formation module 263 may use at least one of the following decomposition algorithms:

the method of principal components (Principal Component Analysis, PCA);

a singular decomposition;

non-negative matrix decomposition (non-negative matrix factorization, NNMF/NMF).

In another aspect, the initial matrix contains some zero values. These values correspond to events that were not intercepted on the user's device and were not classified. In order to predict these values an arbitrary matrix may be formed which may be represented as a product of vectors. Then particular vector values are selected in order to most accurately approximate the nonzero values of the initial matrix using the gradient descent method. As a result, the optimal matrix most accurately approximates the nonzero values of the initial matrix, and in place of zero values it contains the predicted event rating. In an aspect, the formation module 263 may initialize the matrix of user preferences $M_r$ with values obtained as a result of the decomposition of the initial matrix M' such that the reconstructed value of the rating $r_{ij}$ for the event $s_i$ on the mobile device of the user $u_i$ is equal to the scalar product of the vectors $p_i$ and $q_j$ of the matrices P and $Q^t$:

$$r_{ij} = p_i \cdot q_j$$

The formation module 263 may estimate the optimal value of the initialized matrix of user preferences using a gradient descent optimization technique by minimizing the error function:

$$\sum_{(i,j)} (r_{ij} - \mu - b_i - b_j - q_j^T p_i)^2 + \delta\left(\sum_i b_i^2 + \sum_j b_j^2 + \|q_j\|^2 + \|p_i\|^2\right)$$

where $b_i$ is the base predicator of the user $u_i$;

$b_i$ is the base predicator of the event $s_j$;

μ is the mean rating per matrix $M_r$;

δ is a regularization parameter.

The optimal values most accurately approximate the nonzero values of the initial matrix.

The formation module 263 may determine the rating value of each event from the event database 210 on the user's mobile device 101 based on the matrix of user preferences:

| | $s_1$ | . . . | $s_j$ | . . . | $s_n$ |
|---|---|---|---|---|---|
| $u_1$ | $r_{11}$ | | $r_{1j}$ | | $r_{1n}$ |
| $u_2$ | $r_{21}$ | | $r_{2j}$ | | $r_{2n}$ |
| $u_3$ | $r_{i1}$ | | $r_{ij}$ | | $r_{in}$ |

The value of the element $r_{ij}$ of the matrix $M_r$, characterizing the rating of the event $s_j$ whose media data were not previously intercepted on the mobile device 101 of the user $u_i$, will be non-zero, unlike the corresponding element $r'_{ij}$ of the matrix M'.

In one aspect, the formation module 263 may use, as the profile of the user $u_i$, a vector composed of elements of the matrix of user preferences $M_r$, corresponding to the rating $r_{ij}$ of the event $s_j$ on the mobile device of the user $u_i$:

| | $s_1$ | . . . | $s_j$ | . . . | $s_n$ |
|---|---|---|---|---|---|
| $u_1$ | $r_{i1}$ | | $r_{ij}$ | | $r_{in}$ |

The rule defining module 280 may be configured to define the classification rule 281 of the intercepted event 220.

In one aspect, the rule defining module 280 may determine the classification rule 281 of the intercepted event 220 on the mobile device of the user $u_i$ such that the intercepted event 220 is classified as undesirable on the mobile device 101 of the user $u_i$ if the rating $r_{ij}$ of a similar event 250 $s_j$ in the generated user profile 270 is less than a predetermined value.

In another aspect, the rule defining module 280 may determine the classification rule 281 of the intercepted event 220 belonging to a group of similar events G on the mobile device of the user $u_i$ such that the intercepted event 220 is classified as undesirable on the mobile device of the user $u_i$ if the measure of central tendency of the rating values $r_{ij}$ of all events $s_j$ in the generated user profile 270, where $s_j \in G$, is less than a predetermined value.

In one variant aspect, the disclosed system may also include a blocking module 290 that may be configured to block the intercepted event 220 on the user's mobile device 101.

In one aspect, the blocking module 290 may block the intercepted event 220 on the mobile device of the user 102 if, according to the classification rule 281 defined by the rule defining module 280, the intercepted event 220 is classified as undesirable on the mobile device of the user 101.

Figure 3:
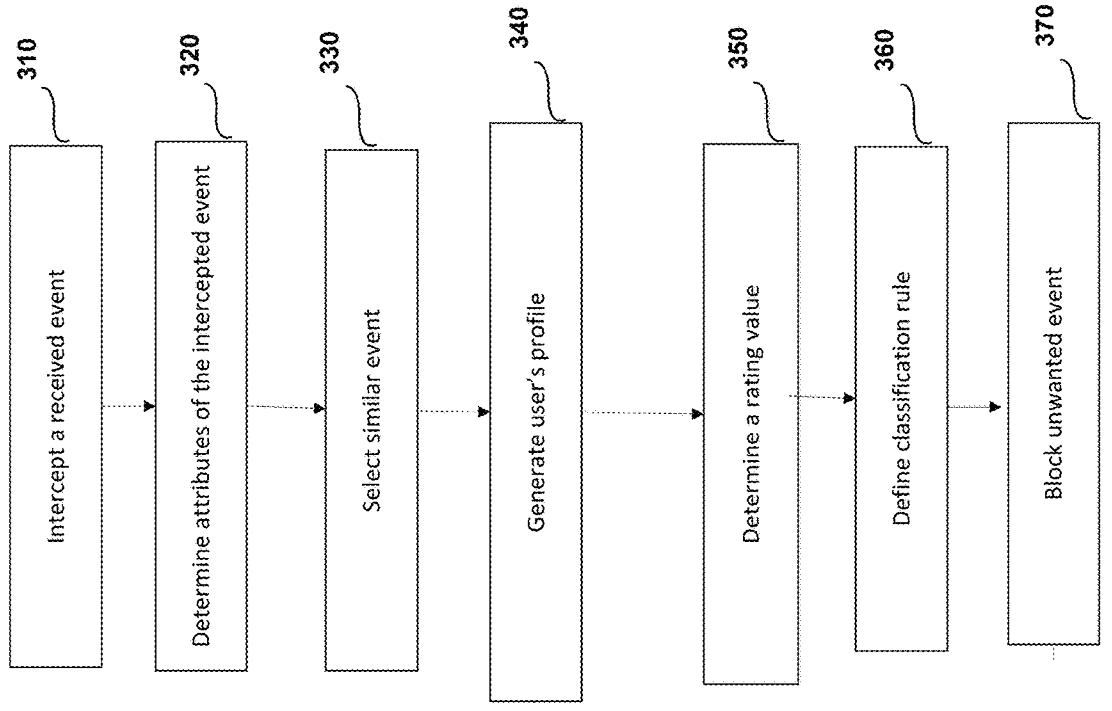
FIG. 3 illustrates an example of a method for defining classification rules of intercepted events on user's mobile device.

FIG. 3 illustrates a method for defining classification rules of intercepted events on user's mobile device, in accordance with aspects of the present disclosure.

The structural diagram of the method for defining classification rules of intercepted events on the user's mobile device involves a step 310 in which an incoming event received by a mobile device is intercepted, a step 320 in which content of the intercepted event is analyzed to determine one or more attributes of the intercepted event, a step 330 in which a similar event is selected, an optional step 340 in which a user profile is determined, a step 350 in which a rating value of the selected similar event is determined, a step 360 in which a classification rule is determined, and a step 370 in which an undesirable event is blocked.

In an aspect, at step 310, the characteristic determination module 230 may intercept an incoming event received by a mobile device 101. In one aspect, the incoming event on the user's mobile device 101 may include, but is not limited to: a received incoming call; a received incoming SMS message; a received incoming email; a downloaded HTML page.

Methods of intercepting of incoming communication by a mobile device are well-known in the art.

At step 320, the characteristic determination module 230 may analyze the intercepted event 220 to determine the characteristics of the intercepted event 220. The characteristic of the incoming event may include, without limitation, at least:

recognized speech;

the text of a SMS message;

the content of the service fields of an email;

the content of an email;

the content of the service headers of a HTML page;

the content of a HTML page.

In an aspect, the characteristic determination module 230 may be configured to automatically transform a voice call into formatted text using a speech recognition algorithm, for example. Furthermore, at step 320, the event selection module 240 may identify attributes for determining the similarity of two events on the basis of the analyzed characteristics. The identified attributes may include, but are not limited to:

words;

a sequence of words (n-grams);

a vectorial representation of words (word-embedding);

a multiple set of words, not considering grammar or order (bag-of-words)

For example, in one aspect, the event selection module 240 may transform the received SMS message “Autumn discounts—20% on women's shoes” into a vector. In one aspect, the event selection module 240 may identify a set of attributes for determining the similarity of events $s_i$ from the event database 210. The identified set may be represented in the form of a dictionary length vector n, where the number of occurrences $f_{ij}$ of that word in the characteristic of the event $s_i$ appears in the position corresponding to the number of the word $w_j$.

At step 330, the event selection module 240 may determine a similar event 250 on the basis of the characteristics determined. In one aspect, the event selection module 240 may calculate the similarity of one or more events from the event database 210 to the intercepted event 220. For example, the event selection module 240 may calculate a cosine distance value between a vector corresponding to the intercepted event and each of the plurality of vectors corresponding to the plurality of events in the event database 210. The event selection module 240 may use the cosine distance value as the measure of similarity. In an aspect, one or more events from the event database 210 whose similarity to the intercepted event 220 is greater than a predetermined value may be sent by the event selection module 240 to the rule defining module 280.

In addition, in one aspect, at an optional step 340 the profile creating module 260 may generate the user profile 270 and send the user profile 270 to the rule defining module 280. The profile creating module 260 may consist of the attribute determination module 261, the rating computing module 262, and the formation module 263. In one aspect, the formation module 263 may use, as the profile of the user $u_i$, a vector composed of elements of the matrix of user preferences $M_r$, corresponding to the rating $r_{ij}$ of the event $s_j$ on the mobile device of the user. The formation module 263 may estimate the optimal value of the initialized matrix of user preferences using a gradient descent optimization technique by minimizing the error function:

$$\sum_{(i,j)}\left(r_{ij}-\mu-b_i-b_j-q_j^T p_i\right)^2+\delta\left(\sum_i b_i^2+\sum_j b_j^2+\|q_j\|^2+\|p_i\|^2\right)$$

where $b_i$ is the base predicator of the user $u_i$;

$b_j$ is the base predicator of the event $s_j$;

μ is the mean rating per matrix $M_r$;

δ is a regularization parameter.

At step 350, the rating determination module 262 may determine the rating value of each event from the event database 210 on the user's mobile device 101 based on the matrix of user preferences. The value of the element $r_{ij}$ of the matrix $M_r$, characterizing the rating of the event $s_j$ whose media data were not previously intercepted on the mobile device 101 of the user $u_i$, will be non-zero, unlike the corresponding element $r'_{ij}$ of the matrix M'. The rating value characterizes the probability that the event belongs to a particular class. The rating determination module 262 may be further configured to determine the rating value of the one or more events similar events 250 and may send the computed rating value of the one or more similar events 250 to the formation module 263.

At step 360, the rule defining module 280 may define the classification rule 281 on the basis of the generated user profile 270 and the similar event 250. In one aspect, the rule defining module 280 may determine the classification rule 281 of the intercepted event 220 on the mobile device of the user $u_i$ such that the intercepted event 220 is classified as undesirable on the mobile device 101 of the user $u_i$ if the rating $r_{ij}$ of a similar event 250 $s_j$ in the generated user profile 270 is less than a predetermined value. In another aspect, the rule defining module 280 may determine the classification rule 281 of the intercepted event 220 belonging to a group of similar events G on the mobile device of the user $u_i$ such that the intercepted event 220 is classified as undesirable on the mobile device of the user $u_i$ if the measure of central tendency of the rating values $r_{ij}$ of all events $s_j$ in the generated user profile 270, where $s_j \in G$, is less than a predetermined value.

In addition, in one aspect, the blocking module 290, at step 370 may selectively block the undesirable event, based on the classification rule 281. For example, a blocked event may not be displayed to the user, arrive without notification, or be placed in a special storage.

Figure 4:
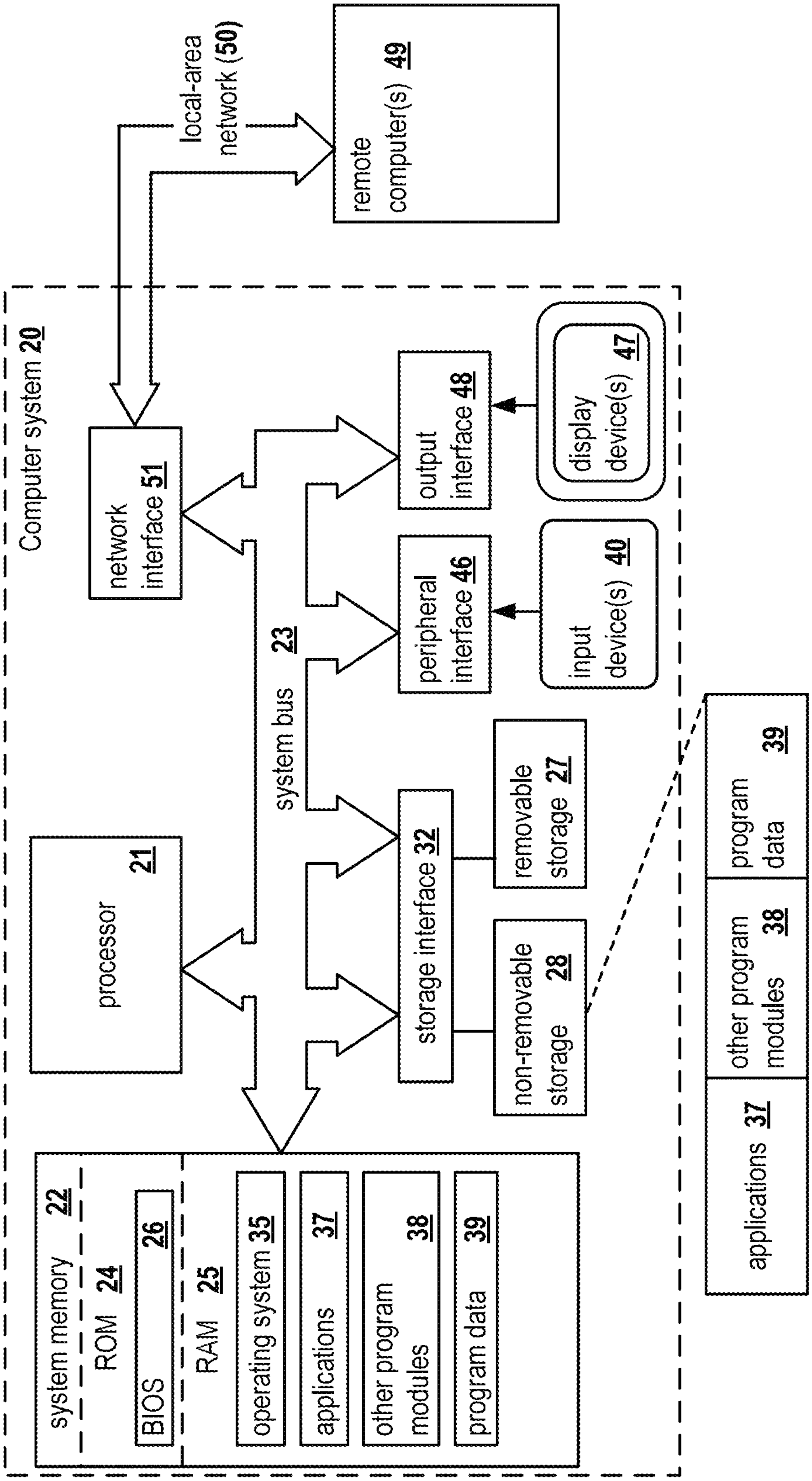
FIG. 4 shows an example of a computer system on which variant aspects of systems and methods disclosed herein may be implemented.

FIG. 4 is a block diagram illustrating a computer system 20 on which aspects of systems and methods for defining classification rules of intercepted events on user's mobile device, and for classifying incoming events by user's mobile device, e.g., based on user preferences may be implemented in accordance with an exemplary aspect. The computer system 20 may represent the computer system 200 of FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for classifying incoming events by user's mobile device based on user preferences, the method comprising:

- intercepting an incoming event received by a mobile device;
- analyzing content of the intercepted event and determining one or more attributes associated with words in the content of the intercepted event;
- comparing the intercepted event to a plurality of previously collected and classified events, stored in an event repository, based on the one or more determined attributes to identify one or more similar events;
- determining a rating value of the one or more similar events based on a matrix of user preferences, wherein the matrix of user preferences approximates nonzero values of an initial matrix of the plurality of previously collected and classified events and contains a predicted event rating in place of zero values of the initial matrix, the zero values corresponding to events that were not intercepted on the mobile device, and wherein the rating value indicates probability that the one or more similar events belongs to a particular class of events representing events of user interest; and
- classifying the intercepted event as undesirable on the mobile device if the rating value of the one or more similar events is less than a predetermined threshold value.

2. The method of claim 1, wherein the rating value is based on one or more rating attributes that comprise at least one of: parameters of a media content of the intercepted event, time duration from the moment of interception of the intercepted event, a flag for viewing the media content of the intercepted event by a user, a flag for removal of the media content of the intercepted event by the user.

3. The method of claim 1, wherein the one or more determined attributes include at least one of: words, a sequence of words, a vectorial representation of words, or multiple sets of words representing a bag-of-words.

4. The method of claim 1, wherein the rating value is determined using a machine learning model based on one or more rating attributes, and wherein the machine learning model comprises one of: a naive Bayesian classifier model, a logistic regression model, a Markov Random Field (MRF) classifier model, a Support Vector Machine (SVM) model, a k nearest-neighbor model, and a decision tree model.

5. The method of claim 1, wherein the classifying of the intercepted event comprises determining a mobile user profile from the plurality of previously collected and classified events, and wherein the mobile user profile comprises a vector containing elements of the matrix of user preferences.

6. The method of claim 5, wherein the determining of the mobile user profile comprises reconstructing approximated values of the matrix of user preferences using a gradient descent optimization, and determining the rating value based on zero values of the reconstructed matrix of user preferences.

7. The method of claim 1, wherein comparing the intercepted event to the plurality of previously collected and classified events comprises further comprises:

- generating a vector representing the intercepted event;
- generating a plurality of vectors representing the plurality of previously collected and classified events; and
- calculating a similarity value between the intercepted event and each of the plurality of previously collected and classified events based on cosine distance values between corresponding vectors.

8. A system for classifying incoming events by user's mobile device based on user preferences, the system comprising:

- at least one memory; and
- at least one hardware processor coupled with the at least one memory and configured, individually or in combination, to:
  - intercept an incoming event received by a mobile device;
  - analyze content of the intercepted event and determine one or more attributes associated with words in the content of the intercepted event;
  - compare the intercepted event to a plurality of previously collected and classified events, stored in an event repository, based on the one or more determined attributes to identify one or more similar events;
  - determine a rating value of the one or more similar events based on a matrix of user preferences, wherein the matrix of user preferences approximates nonzero values of an initial matrix of the plurality of previously collected and classified events and contains a predicted event rating in place of zero values of the initial matrix, the zero values corresponding to events that were not intercepted on the mobile device, and wherein the rating value indicates probability that the one or more similar events belongs to a particular class of events representing events of user interest; and classify the intercepted event as undesirable on the mobile device if the rating value of the one or more similar events is less than a predetermined threshold value.

9. The system of claim 8, wherein the rating value is based on one or more rating attributes that comprise at least one of: parameters of a media content of the intercepted event, time duration from the moment of interception of the intercepted event, a flag for viewing the media content of the intercepted event by a user, a flag for removal of the media content of the intercepted event by the user.

10. The system of claim 8, wherein the one or more determined attributes include at least one of: words, a sequence of words, a vectorial representation of words, or multiple sets of words representing a bag-of-words.

11. The system of claim 8, wherein the rating value is determined using a machine learning model based on one or more rating attributes, and wherein the machine learning model comprises one of: a naive Bayesian classifier model, a logistic regression model, a Markov Random Field (MRF) classifier model, a Support Vector Machine (SVM) model, a k nearest-neighbor model, and a decision tree model.

12. The system of claim 8, wherein the classifying of the intercepted event comprises determining a mobile user profile from the plurality of previously collected and classified events, and wherein the mobile user profile comprises a vector containing elements of the matrix of user preferences.

13. The system of claim 12, wherein the determining of the mobile user profile comprises reconstructing approximated values of the matrix of user preferences using a gradient descent optimization, and determining the rating value based on zero values of the reconstructed matrix of user preferences.

14. The system of claim 8, wherein comparing the intercepted event to the plurality of previously collected and classified events comprises further comprises:

generating a vector representing the intercepted event;

generating a plurality of vectors representing the plurality of previously collected and classified events; and calculating a similarity value between the intercepted event and each of the plurality of previously collected and classified events based on cosine distance values between corresponding vectors.

15. A non-transitory computer readable medium storing thereon computer executable instructions for classifying incoming events by user's mobile device based on user preferences, including instructions for:

intercepting an incoming event received by a mobile device;

analyzing content of the intercepted event and determining one or more attributes associated with words in the content of the intercepted event;

comparing the intercepted event to a plurality of previously collected and classified events, stored in an event repository, based on the one or more determined attributes to identify one or more similar events;

determining a rating value of the one or more similar events based on a matrix of user preferences, wherein the matrix of user preferences approximates nonzero values of an initial matrix of the plurality of previously collected and classified events and contains a predicted event rating in place of zero values of the initial matrix, the zero values corresponding to events that were not intercepted on the mobile device, and wherein the rating value indicates probability that the one or more similar events belongs to a particular class of events representing events of user interest; and classifying the intercepted event as undesirable on the mobile device if the rating value of the one or more similar events is less than a predetermined threshold value.

16. The non-transitory computer readable medium of claim 15, wherein the rating value is based on one or more rating attributes that comprise at least one of: parameters of a media content of the intercepted event, time duration from the moment of interception of the intercepted event, a flag for viewing the media content of the intercepted event by a user, a flag for removal of the media content of the intercepted event by the user.

17. The non-transitory computer readable medium of claim 15, wherein the one or more determined attributes include at least one of: words, a sequence of words, a vectorial representation of words, or multiple sets of words representing a bag-of-words.

18. The non-transitory computer readable medium of claim 15, wherein the rating value is determined using a machine learning model based on one or more rating attributes, and wherein the machine learning model comprises one of: a naive Bayesian classifier model, a logistic regression model, a Markov Random Field (MRF) classifier model, a Support Vector Machine (SVM) model, a k nearest-neighbor model, and a decision tree model.

19. The non-transitory computer readable medium of claim 15, wherein the classifying of the intercepted event comprises determining a mobile user profile from the plurality of previously collected and classified events, and wherein the mobile user profile comprises a vector containing elements of the matrix of user preferences.

20. The non-transitory computer readable medium of claim 19, wherein the determining of the mobile user profile comprises reconstructing approximated values of the matrix of user preferences using a gradient descent optimization, and determining the rating value based on zero values of the reconstructed matrix of user preferences.

21. The non-transitory computer readable medium of claim 15, wherein comparing the intercepted event to the plurality of previously collected and classified events comprises further comprises:

generating a vector representing the intercepted event;

generating a plurality of vectors representing the plurality of previously collected and classified events; and calculating a similarity value between the intercepted event and each of the plurality of previously collected and classified events based on cosine distance values between corresponding vectors.

* * * * *